United States Patent Office 2,839,664
Patented June 17, 1958

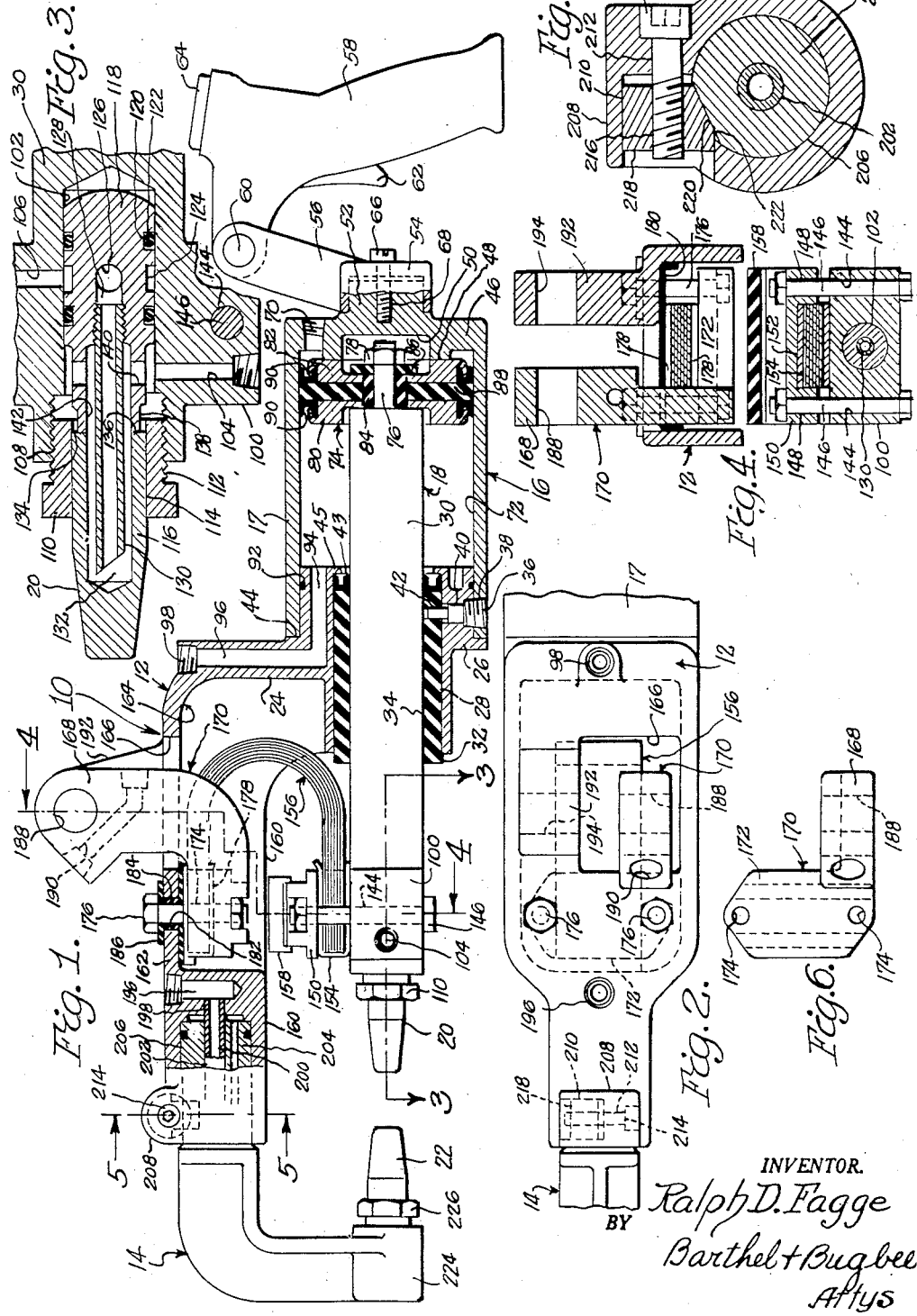

2,839,664

SPOT WELDING GUN

Ralph D. Fagge, Detroit, Mich.; Sophie A. Fagge, administratrix of the estate of said Ralph D. Fagge, deceased Application January 3, 1955, Serial No. 479,301

5 Claims. (Cl. 219—89)

This invention relates to welding apparatus and, in particular, to so-called spot welding guns.

One object of this invention is to provide a spot welding gun or portable welding implement having improved means for quickly and easily removing and replacing various parts of the gun or implement which are subject to wear, deterioration or breakage.

Another object is to provide a spot welding gun of the foregoing character having a solid and unperforated laminated metal jumper which conveys welding current to the reciprocating piston rod and thence to the movable welding electrode, thereby providing a jumper which is stronger and less subject to breakage than prior perforated jumpers for this purpose, as well as being quickly and easily replaceable.

Another object is to provide a spot welding gun of the foregoing character having a fully insulated piston and piston rod for moving the movable welding electrode, so that no short circuit of the welding current can occur by way of this piston or its cylinder.

Another object is to provide a spot welding gun of the foregoing character wherein the piston is reciprocably mounted in a demountable cylinder which is quickly and easily detached for repairs or maintenance purposes.

Another object is to provide a spot welding gun of the foregoing character wherein the movable electrode is clamped to the piston rod and the latter is provided with a non-rotating abutment to which the current-carrying jumper is secured, so as to prevent rotation while a wrench is being used on the electrode retaining collar during insertion or removal of electrodes.

Another object is to provide a spot welding gun of the foregoing character having improved means for watercooling the movable electrode mounted on the piston.

Other objects and advantages of the invention will become apparent during the course of the following description of the accompanying drawings, wherein:

Figure 1 is a side elevation, partly in central vertical section, of a spot welding gun according to one form of the invention;

Figure 2 is a fragmentary top plan view of the central portion of the spot welding gun shown in Figure 1;

Figure 3 is a horizontal section taken along the line 3—3 in Figure 1, showing the improved means for mounting and water-cooling the reciprocable welding electrode;

Figure 4 is a cross-section taken along the zigzag line 4—4 in Figure 1, showing the spot welding gun terminals and the jumper mounting of the spot welding gun;

Figure 5 is a cross-section taken along the line 5—5 in Figure 1, showing the improved mounting for the stationary electrode-holding jaw; and Figure 6 is a top plan view of the welding cable attachment terminal and jumper clamp shown in Figures 1, 2 and 4.

Referring to the drawings in detail, Figure 1 shows a portable spot welding gun, generally designated 10, according to one form of the invention as is used for spot welding metallic parts to one another on production lines or in shops and other locations where it is more convenient to bring the welding apparatus to the work than to bring the work to the welding apparatus. Such welding guns, as they are known, are widely used in the automotive and agricultural machinery industries and in numerous other industries where sheet metal parts are to be united quickly and easily at low cost, and the term "welding gun" is commonly applied to a portable welding implement of this character.

The welding gun 10 consists of a frame, generally designated 12, to one end of which is attached a stationary electrode jaw 14 and to the other end a pressure-fluid-operated reciprocating motor 16 with a cylinder 17 containing a reciprocable piston unit, generally designated 18, by which a movable welding electrode 20 is moved toward and away from a stationary electrode 22 carried by the jaw 14 for clamping sheet metal work between the electrodes 20 and 22 while a spot welding current is passed through them to spot weld the workpieces to one another.

The frame 12 is approximately L-shaped with a rearward arm portion 24 terminating in an approximately cylindrical head 26 having a central bore 28 for the passage of the piston rod 30 of the piston unit 18. An insulating bushing 32 of electrical insulating material, such as the synthetic plastic known commercially as nylon, is mounted in the central bore 28 of the cylindrical enlargement 26 and has a bore 34 through which the piston rod 30 snugly but slidably passes. A screw 36 is inserted through aligned holes 38, 40 and 42 in the cylinder 17, cylindrical head 26 and bushing 32 respectively at each of several locations spaced around the periphery thereof, and holds these parts separably and detachably in assembly, the cylinder head 26 being provided with a cylindrical recess 44 to receive the open end of the cylinder 17. A conventional piston rod seal 43 is mounted in the bore 28 between the end of the bushing 32 and a retaining flange 45.

The opposite or closed end wall 46 of the cylinder 17 is provided with an internal annular abutment 48 surrounding a central recess 50 and also is provided with a cylindrical boss 52 projecting outward and serving as an anchorage for a cup-shaped lower end portion 54 of a handle holder or arm 56 to which a pistol grip handle 58 is attached as at 60. The handle 58 is provided with a trigger 62 which operates a control valve (not shown) within the handle 58 for controlling the flow of compressed air or other pressure fluid to the motor 16, a boss 64 with a suitably threaded hole (not shown) being provided for a hose coupling for this purpose. A screw or other fastener 66 threaded through the cup-shaped portion 54 of the holder 56 and into a threaded hole 68 in the boss 52 secures the handle holder 56 to the cylinder end wall 46, which is provided with a threaded port 70 for the reception of a flexible hose (not shown) leading from the handle 58 to the cylinder 17 to supply compressed air or other pressure fluid to the cylinder 17.

The cylinder 17 is provided with a cylinder bore 72 in which reciprocates a piston head, generally designated 74, attached to a reduced diameter extension 76 of the piston rod 30 and held in place by a retaining nut 78 threaded thereon. The piston head 74 is composed of two recessed flanged discs 80 and 82 bored to receive an insulating bushing 84 and also recessed to receive the piston rod 30 on the one hand and an insulating washer 86 on the other hand. Held between the discs 80 and 82 and bored centrally to receive the insulating bushing 84 is a piston guide disc 88, the disc 88, bushing 84 and washer 86 being also preferably formed of the synthetic plastic known commercially as nylon. Mounted on the periphery of each disc 80 and 82 is a conventional seal 90 held in retention by the flanged disc 80 or 82.

The cylinder head 26 adjacent its junction with the cylinder 17 is provided with an annular groove 92 opening off the cylindrical recess 44 and receiving a conventional "O-ring" (not shown). The cylinder head 26 is also provided with a port 94 leading by way of a passageway 96 to a threaded connection 98 for the reception of a compressed air hose (not shown), the passage of air through which is also controlled by the trigger 62 operating the valve (not shown) within the handle 58. The outer or free end of the piston rod 30 is provided with a block or cross head 100 which extends transversely across the end of the piston rod 30 (Figures 3 and 4). The block 100 is provided with a central longitudinal bore 102 to the opposite sides of which transverse bores or threaded ports 104 and 106 lead respectively. The ports 104 and 106 serve for the admission and discharge of cooling water or other cooling fluid for cooling the movable electrode 20. The bore 102 is provided with a slightly enlarged and preferably tapered threaded counterbore 108 in which is mounted a tubular externally-threaded nut 110 with a slightly tapered threaded portion 112 threadedly engaging the threaded counterbore 108. The nut 110 is provided with a central bore 114 for snugly receiving the cylindrical shank 116 of the electrode 20 so that when the nut 110 is rotated to thread it into the bore 108, the shank 116 of the electrode 20 will be firmly clamped in position.

Mounted in the bore 102 is a hollow cylindrical spool 118 (Figure 3) having spaced annular grooves 120 therein for receiving O-rings 122 of rubber or other suitable resilient material. The spool 118 also contains a third annular groove or channel 124 which communicates with the port 106 and also with a diametral passageway 126 which has a threaded port 128 in which is mounted the threaded inner end of a tube 130. The outer end of the tube 130 opens into a chamber 132 within the electrode 20, this chamber extending rearwardly through the shank 116 to the rearward end 134 thereof. The latter abuts the forward end 136 of the reduced diameter portion 138, the latter having ports 140 therein leading into the central chamber 142 which communicates with the central chamber 132 of the electrode 20. By this construction, the movable electrode 20 is internally cooled to remove the heat developed during welding, as explained below in connection with the operation of the invention.

The block 100 on the outer end of the piston rod 30 is provided with a pair of spaced bolt holes 144 (Figure 4) on opposite sides of the central bore 102 for receiving a pair of jumper clamping bolts 146, the upper end portions of which pass through aligned bores 148 in a jumper clamping block 150. The latter is provided with an approximately rectangular recess 152 for receiving a U-shaped clip 154 (Figure 1), the opposite sides of which rest against the blocks 100 and 150. Inserted in the clip 154 is the lower end of a flexible laminated jumper 156 formed of multiple strips of spring brass, copper or the like and clamped in position against the block 100 by the clamping block 150. The latter is grooved or otherwise recessed to receive an insulating guide block 158 secured therein. The guide block 158 is formed of any suitable electrical insulating material, such as that known commercially as Micarta, and is spaced a slight distance from the straight flat under side 160 (Figure 1) of the forward arm portion 162 of the L-shaped frame 12.

The forward arm portion 162 of the frame 12 is approximately U-shaped for a portion of its length so as to provide a cavity 164 adapted to receive the upper portion of the jumper 156 (Figures 1 and 4). A hole 166 leads through the arm portion 162 into the cavity 164, and through this hole projects the upper portion 168 of an L-shaped terminal 170, the lower portion 172 of which is disposed at right angles to the upper portion 168 and is in the form of a jumper clamping block drilled with spaced parallel holes 174 for the reception of clamping bolts 176. The upper end of the jumper 156 is secured within a U-shaped clip 178 similar to the lower clip 154 and similarly clamped by the clamping bolts 176 and block portion 172 against the under side of the forward arm portion 162 of the frame 12 within the cavity 164.

Interposed between the frame portion 162 and the upper clip 178 is a flanged insulating plate or layer 180 of fiber or other suitable electrical insulating material, the edge flanges preventing any possible contact between the terminal 170 or the clip 178 and jumper 156 and the forward portion 162 of the frame 12. The insulating layer 180 is drilled for the passage of the bolts 176, which also pass through tubular insulators 182 of insulating fiber or other suitable electrical insulating material located in holes 184 through the forward portion 162 of the frame 12, insulating washers 186 of similar insulating material being placed on the bolts 176 adjacent their heads so as to prevent electrical contact between the bolt heads and the adjacent frame portion 162 (Figure 1).

The upper portion of the terminal 170 is provided with a transverse bolt hole 188 adapted to receive a clamping bolt (not shown) for the terminal portion of a welding cable head (not shown) such as a welding cable, for example, of the type shown in the Wreford Patent 2,504,777 of April 15, 1950. The terminal 170 is provided with a water cooling passageway 190 adapted to be connected at its opposite ends to water cooling hoses for additionally cooling the terminal 170. The hole 166 is sufficiently larger than the upper arm portion 168 of the terminal 170 to prevent contact between the frame portion 162 and the terminal portion (Figure 1).

Integral with and rising from the forward arm portion 162 of the frame 12 is a lug 192 disposed parallel to the terminal arm portion 168 and similarly provided with a cable head clamping bolt hole 194 aligned with the cable head clamping bolt hole 188. A clamping bolt (not shown) passing through the holes 188 and 194 and through a similar hole in the end of the cable head (not shown) securely clamps the cable head between the lug 192 and the terminal portion 168. Because of the fact that the portion 172 of the terminal makes electrical contact with the upper end of the laminated jumper 156 only on its inner side (the outer side of the upper end being insulated from the welding gun frame 12) and because the outer side of the lower end of the jumper 156 makes electrical contact with the plunger cross head 100 of the piston rod 30, the welding current is forced to cross over from the innermost lamination to the outermost lamination and thus make use of the entire cross-section of the jumper 156. This in turn reduces the resistance and heating arising in prior spot welding guns. In such prior spot welding guns, where the terminal is electrically connected to the upper side of the upper end of the laminated jumper, the current flow tends to be concentrated in the outermost lamination or laminations of the jumper since no such "cross-over" of current flow occurs, and consequently the higher resistance causes excessive heating and also greater drop in voltage of the current reaching the welding electrodes of the welding gun. The forward arm portion 162 is also provided with a threaded water cooling port or passageway 196 for the connection of a water cooling hose, this port or passageway 196 opening into a longitudinal hole 198 which is threaded to receive the threaded rearward end of a water tube 200 which extends into an aligned hole 202 in the cylindrical shank 204 of the L-shaped stationary electrode jaw 14. The water tube 200 cools the stationary electrode 22 in a manner similar to the movable electrode 20 (Figure 3), and the details of this cooling arrangement are outside the scope of the present invention.

The shank 204 is seated in a cylindrical socket 206 within the forward arm portion 162. The arm portion 162 is provided with a lug 208 containing a socket 210 and a screw hole 212 adapted to receive a screw 214 (Figure 5). The threaded shank of the screw 214 is threaded through a threaded hole 216 in an approximately cylindrical clamping nut 218 which fits into the socket 210. The nut 218 has a flattened side portion 220 engaging a correspondingly flattened portion 222 on the cylindrical shank 204 to prevent rotation of the latter and to accurately locate it so that the stationary electrode 22 is aligned with the movable electrode 20.

The L-shaped stationary electrode jaw 14 is provided at its outer end with a hollow boss 224 which is bored and threaded to receive a tubular nut 226 similar to the tubular nut 110 of the movable electrode 20 and similarly clamping the stationary electrode 22 in a fixed position on the end of the jaw 14 and yet enabling rapid and easy replacement of the electrode 22.

In the operation of the invention, let it be assumed that the connections mentioned above have been made by means of flexible air hose to a source of compressed air and that the terminals or lugs 170 and 172 have been bolted to the cable head of a conventional welding cable by means of a clamping bolt passed through the aligned holes 188 and 194 and the corresponding hole in the cable head. Let it also be assumed that the welding gun 10 has been carried to a position adjacent the sheet metal parts to be united, such as, for example, sheet metal automobile body panels, and that the welding cable has been connected to a suitable source of electric welding current, such as to the output or secondary terminals of a conventional welding transformer.

To weld the sheet metal pieces or panels together, the operator manipulates the welding gun 10 so as to slide the welding electrodes 20 and 22 downward over the sheets to be welded, so that these lie between the electrodes 20 and 22. Having properly located the welding electrodes 20 and 22 at the place where it is desired to make the weld, the operator, while holding the handle 58 in one hand and some other part of the welding gun 10, such as the cylinder 17, in the other hand, pulls the trigger 62, thereby shifting the air control valve within the handle 58. This action causes compressed air or other pressure fluid to pass through the port 70 into the rearward end of the cylinder 17, acting against the rearward side of the piston head 74 and forcing the piston rod 30 and the block 100 containing the movable electrode 20 forward into engagement with the metal sheets, clamping them tightly between the fixed and movable electrodes 22 and 20.

Meanwhile, welding current passing into the welding gun 10 by way of the terminals 170 and 192 makes its way through the jumper 156 and the electrode 20 through the metal sheets to the stationary electrode 22 and thence through the stationary electrode jaw 14 and the frame 12 to the lug 192, completing the circuit, whereupon the heat generated at the portions of the metal sheets clamped between the electrodes 20 and 22 fuses the sheets to one another and effects spot welding of these parts. When the weld has been thus made, the operator releases the trigger 62, shifting the valve within the handle 58 so that the piston 18 is returned to its retracted position shown in Figure 1, ready to perform another welding operation.

What I claim is:

1. A spot welding gun comprising a frame structure having an elongated rectilinear guideway extending therealong, a stationary electrode holder mounted on said frame structure, a reciprocatory motor mounted on said frame structure and having a reciprocating plunger structure mounted with its axis of reciprocation disposed parallel to said guideway and movable toward and away from said stationary electrode holder, a movable electrode holder mounted on said plunger structure in alignment with said stationary electrode holder, a current-conducting jumper seat mounted on each of said structures, a flexible current-conducting jumper disposed between said structures and having opposite end portions engaging said seats, a clamping device securing each jumper end portion to its respective seat, and a guide element secured to said plunger structure and extending into close proximity to the said guideway for travel therealong during reciprocation of said plunger structure whereby to prevent rotation of said movable electrode holder during reciprocation thereof and during replacement of electrodes in said movable electrode holder.

2. A spot welding gun comprising a frame structure, a stationary electrode holder mounted on said frame structure, a reciprocatory fluid pressure motor mounted on said frame structure and having a cylinder containing a cylinder bore and a reciprocable piston therein a reciprocating plunger structure connected to said piston and movable toward and away from said stationary electrode holder, said frame structure having a projection thereon extending into said cylinder bore in telescoping relationship with said cylinder, means detachably securing said cylinder to said projection, a movable electrode holder mounted on said plunger structure in alignment with said stationary electrode holder, a current-conducting jumper seat mounted on each of said structures, a flexible current-conducting jumper disposed between said structures and having opposite end portions engaging said seats, and a clamping device securing each jumper end portion to its respective seat.

3. A spot welding gun comprising a frame structure, a stationary electrode holder mounted on said frame structure, a reciprocatory motor mounted on said frame structure and having a reciprocating plunger structure movable toward and away from said stationary electrode holder, a movable electrode holder mounted on said plunger structure in alignment with said stationary electrode holder, said frame structure including a main frame and an extension frame carrying said stationary electrode holder one of said frames having a bore therein and the other frame having a projecting part fitting into said bore and detachably securing to said main frame, means for preventing relative rotation between said main frame and said extension frame, and means for conducting electricity to said electrode holders.

4. A spot welding gun comprising a frame structure, a stationary electrode holder mounted on said frame structure, a reciprocatory motor mounted on said frame structure and having a reciprocating plunger structure movable toward and away from said stationary electrode holder, a movable electrode holder mounted on said plunger structure in alignment with said stationary electrode holder, said frame structure including a main frame and an extension frame carrying said stationary electrode holder one of said frames having a bore therein and the other frame having a projecting part fitting into said bore and detachably securing to said main frame, means comprising a flattened portion on said projecting part and a clamping element on said main frame engaging said flattened portion for preventing relative rotation between said main frame and said extension frame, and means for conducting electricity to said electrode holders.

5. A spot welding gun comprising a frame structure, a stationary electrode holder mounted on said frame structure, a reciprocatory motor mounted on said frame structure and having a reciprocating plunger structure movable toward and away from said stationary electrode holder, a movable electrode holder mounted on said plunger structure in alignment with said stationary electrode holder, a flexible laminated current-conducting jumper, one end of said jumper being insulatedly secured to said frame structure and its other end being conductingly secured to said plunger structure, and a welding cable connection terminal conductingly secured to said one end of said jumper on the opposite side thereof from the side conductingly engaging said plunger structure, whereby the welding current passing through said jumper must cross over said jumper from one side to the other side thereof in traveling between said terminal and said plunger structure.

References Cited in the file of this patent

UNITED STATES PATENTS

| | | |
|---|---|---|
| 1,326,601 | Ledwinka | Dec. 30, 1919 |
| 2,126,903 | Martin | Aug. 16, 1938 |
| 2,211,551 | Winkler | Aug. 13, 1940 |
| 2,215,289 | Hensel et al. | Sept. 17, 1940 |
| 2,379,983 | Munson | July 10, 1945 |
| 2,465,456 | Johnson | Mar. 29, 1949 |
| 2,471,881 | Manning et al. | May 31, 1949 |
| 2,535,946 | Mulder | Dec. 26, 1950 |
| 2,709,212 | Macewka | May 24, 1955 |